United States Patent

Manasevit

[15] 3,664,866

[45] May 23, 1972

[54] COMPOSITE, METHOD FOR GROWTH OF IIb–VIa COMPOUNDS ON SUBSTRATES, AND PROCESS FOR MAKING COMPOSITION FOR THE COMPOUNDS

[72] Inventor: Harold M. Manasevit, Anaheim, Calif.

[73] Assignee: North American Rockwell Corporation

[22] Filed: Apr. 8, 1970

[21] Appl. No.: 26,574

[52] U.S. Cl. ....................117/201, 117/106 A, 252/62.32 T

[51] Int. Cl. ....................B44d 1/18

[58] Field of Search ....................117/201, 106 A; 252/62.32 T

[56] References Cited

UNITED STATES PATENTS 3,472,685 10/1969 Marfaing et al....................117/201

3,433,686 3/1969 Marinace....................117/201 X 3,409,464 11/1968 Shiozawa....................117/201

*Primary Examiner*—William L. Jarvis

*Attorney*—L. Lee Humphries, H. Fredrick Hamann, Edward Dugas and Martin E. Gerry

[57] ABSTRACT

A composite comprises a substrate of monocrystalline structure which is either a hexagonal, cubic, rhombohedral or orthorhombic, and a monocrystalline layer on the substrate of a JQ compound formulation wherein J is at least one element selected from the group consisting of cadmium, zinc and mercury, and wherein Q is at least one element selected from the group consisting of sulfur, tellurium, selenium and/or oxygen. An alkyl or hydride type dopant may be used to provide a homogeneously doped layer. Processes for making the layer composition and for making the composite are described.

14 Claims, 7 Drawing Figures

INVENTOR.
HAROLD M. MANASEVIT

BY Martin E. Gerry
AGENT

INVENTOR.
HAROLD M. MANASEVIT

BY Martin E. Kerry

AGENT

COMPOSITE, METHOD FOR GROWTH OF $II_b$–$VI_a$ COMPOUNDS ON SUBSTRATES, AND PROCESS FOR MAKING COMPOSITION FOR THE COMPOUNDS

BACKGROUND OF THE INVENTION

1. Field of Invention

This invention relates to a process for providing a composition and a method for providing a layer utilizing the composition on monocrystalline substrate crystals and for doping the layers for use in semiconductive or solid state devices.

2. Prior Art

Compounds of the type J-Q, where J may include Cd, Zn, and Hg, and the Q may include S, Se, Te and O, have been of interest for a long time as photoconductors and phosphors. They have recently become important as piezoelectric materials for use in ultrasonic transducers and as semiconductors in field-effect devices. They have been used in photovoltaic cells, Hall generators, and electroluminescent devices. The mixed crystals or alloys such as (CdHg)Te, Cd(S,Se), Zn(SeTe), etc. are also being studied as photodetectors and other related devices.

This field of invention has utilized gaseous hydrogen as a carrier gas. The hydrogen can be considered a hazard leading to possible explosions. It could influence the coprecipitation of unwanted composites into the crystal, due to its ability to reduce unwanted impurities present in the reactants and it may react with the substrate and/or impurities in the substrate and thereby influence layer quality and purity, particularly when the substrate is unstable in hydrogen. U.S. Pat. No. 3,312,571 has these stated disadvantages. This patent utilizes hydrogen as a carrier gas and as a component requisite for obtaining the necessary composition and layer material. It is pointed out that one of the detriments in utilizing hydrogen is in its overetching effect upon the layer or substrate which reacts with hydrogen, resulting in obstruction of monocrystalline growth of the layer on the substrate.

SUMMARY OF INVENTION

The present invention therefore relates to composites of the JQ composition on insulating substrates and to a process for producing compositions of the JQ formulation and a method for depositing the composition as a layer on a substrate crystal.

It is an object of this invention to provide high quality JQ compounds and single crystal composites by a process that does not require the presence of gaseous hydrogen as a carrier in the system.

It is also an object of this invention to produce high quality compounds of the JQ-type of formulation, where J and Q are elements, and composites of monocrystalline structure by a process that does not use reactive transporting agents such as the hydrogen halides, iodine or pure hydrogen for transporting the composition or its elements to the substrate. Such transport agents may also react with the substrate and/or impurities in the substrate and introduce impurities and defects into the JQ crystal.

In addition to the JQ compounds listed in Table 1 below, mixtures of these compounds are also contemplated as compositions of this invention wherein at least one of the J's is combined with two or more Q's or two or more J's are combined with at least one of the Q's to produce at least mixed binary crystals. Cited for example are the compositions $Zn_xCd_{(1-x)}Se$, $Cd_xHg_{(1-x)}Te$ and $Zn_yCd_{(1-y)}Se_xTe_{(1-x)}$, where $x$ and $y$ have a numerical value greater than zero and less than one.

Another particular advantage to the inventive process is that layers can be produced at relatively fast growth rates, i.e. microns per minute as compared, for example to those prepared by vacuum deposition processes. such JQ compounds that are doped, n- and p-type, by the addition of controlled amounts of appropriate impurities into the layer, particularly during the growth of the layered structures. Typical impurities include aluminum, gallium, and indium, which may be incorporated into the layer by adding very dilute amounts of the alkyl derivatives of these elements to the liquid alkyl containing the J component prior to mixing with the hydride of the Q component, or to the gaseous mixture of the alkyl and hydride, or to the reaction products of the alkyl and hydride. Examples of such alkyl derivatives are trimethylaluminium, triethyaluminium, trimethylgallium, triethylgallium, trimethylindium and triethylindium. Acceptor impurities such as phosphorus, antimony or arsenic can be supplied to the crystal in the form of the hydrides, typically phosphine, stibine, or arsine, and added as above except that it would be more preferable to add them to the hydride rather the alkyl.

Varying the preceding techniques permits the formation of products having by appropriate selection many layers of the same or different compositions of JQ on the same substrate base, each layer having its own band gap, other physical properties, and own electrical conductivity type and resistivity. Because of the simplicity in technique afforded by this invention, it is conceivable to produce such multilayered products in a single apparatus via consecutive growth processes.

The processes to be described have been used to produce the composites of this invention but are not limited in scope to these specific combinations. The processes also are suitable for the growth of layers of JQ on substrates of the same or other JQ compositions when the substrate is compatible with the temperature of JQ formation and on substrates previously described in the literature as being appropriate hosts for the JQ composition.

It is also preferable to select an orientation of the substrate plane that will influence the growth of JQ having a desired orientation plane.

It is, therefore, desirable to have at one's command a method for preparing JQ crystals with a high degree of perfection in the form of single crystals and single crystal layers with high purity and/or with appropriate dopants added to produce either p-type or n-type conductivity in these materials.

It is also desirable to produce JQ as layers on insulating substrates, so that by techniques well-known in the state of the art appropriate masking and etching can be used to define and isolate the layer into separate entities on the substrate. Such isolation makes each entity electrically as well as physically independent from another and permits further fabrication schemes on selected portions of the layer.

By choosing a single crystal insulator as a substrate one can control the crystallinity of the resultant layer so that a single-crystal component is formed consisting of at least one single crystal layer of composition JQ and a single crystal insulator. By appropriate means, dopants may be introduced into the crystals either while they are growing or after they have been formed.

Hence, briefly in accordance with the invention an example is given for the formation or deposition of a zinc selenide film on an aluminum oxide substrate. This example applies to all combinations as shown in Table III, below. At least one polished wafer of aluminum oxide oriented to expose, for example, the (0001) plane is placed in a chamber on a support that can be heated. The reactor is evacuated and then filled with a flowing inert gas such as pure helium or purged with an inert gas to remove any oxidizing gases. The support and wafer thereon are heated to about 700°–750° C. Controlled amounts of dimethylzinc (DMZ) or diethylzinc (DEZ) either diffusing under its own vapor pressure or carried by an inert gas such as pure helium bubbling through or passing over the liquid DMZ or DEZ are then mixed with controlled amounts of hydrogen selenide, either pure or diluted with an inert gas, such as pure helium, in a reactor chamber to form a reaction product. The hydride is preferably used in excess over the stoichiometric amount required to react with the alkyl compound. This reaction product on decomposition at the heated aluminum oxide substrate wafer forms the composition ZnSe and a composite of (111) ZnSe on (0001) aluminum oxide.

Replacement of the aluminum oxide by beryllium oxide or spinel also results in a single crystal layer of ZnSe on these substrate materials.

By controlling the orientation of the substrate wafer one can control the orientation of the deposited JQ compound. In the case of ZnSe, at least the parallel orientations stated in Table III, below have been identified between the deposited ZnSe layer and the substrate used.

The technique described herein can be used to produce other JQ compounds. When hydrogen sulfide is used in place of hydrogen selenide, zinc sulfide will form; hydrogen telluride can be used in the preparation of zinc telluride. Replacement of DMZ or DEZ by for example dimethylcadmium (DMCd) can lead to the formation of CdSe, CdS, or CdTe, depending upon the hydride selected for combination with the DMCd. Using dimethylmercury with the appropriate hydrides can lead to the formation of the mercury-Q compounds. The crystallinity of the JQ compounds formed is, however, dependent upon the temperature of their formation from the reaction product. For example, as indicated, single crystal ZnSe is formed at about 700°–750° C; CdSe, however, is better formed at a lower temperature, about 600° C; ZnS seems to prefer a temperature range of about 725°–775° C, while CdS appears to grow better at about 450°–475° C. The mercury compounds grow at even lower temperatures, about 400°–500 ° C.

Therefore, in the alternative to the prior example discussed, a polished substrate of beryllium oxide, oriented to expose a crystallographic plane such as the $(10\bar{1}1)$ plane is placed on a support that can be heated. The reactor containing the support is evacuated or purged to remove any oxidizing gases and then filled with an inert gas, such as He, which is usually flowing. The support and substrate thereon are heated to about 700° C. Controlled amounts of the alkyl compounds of Zn and Cd, such as diethylzinc (DEZ) and dimethylcadmium (DMCd), respectively, are then introduced or carried into the reactor and mixed with controlled amounts of hydrogen sulfide, usually in excess over the stoichiometric amount required to react with the alkyl compounds. A reaction product is formed which on decomposition at the heated beryllium oxide (BeO) substrate forms an alloy of the composition $Zn_xCd_{1-x}S$, where X is less than one and dependent upon the amounts of DEZ and DMCd originally introduced into the reactor. The alloy $Zn_xCd_{1-x}S$ when deposited as a single crystal layer will have its (111 ) plane parallel to the $(10\bar{1}1)$ plane of BeO.

Also in the alternative to the prior examples discussed, it is possible to illustrate the formation and deposition of a multilayered structure of II*b*–VI*a*, in this case CdS on ZnS on a substrate. The process is similar to that used in connection with the last prior example except that DEZ is introduced into the reactor and mixed with controlled amounts of hydrogen sulfide to produce a reaction product which on decomposition at about 725° to 775° C forms ZnS on the heated substrate. After an appropriate time interval to attain a desired thickness of the ZnS layer, the DEZ is shut off from the system, the temperature is lowered to about 450–500° C, and DMCd is introduced into the reactor with the hydrogen sulfide. A layer of CdS then forms on the layer of ZnS, thereby producing a multilayered structure on the heated substrate.

Therefore, in considering the growth of one single crystal JQ type layer on another, the substrate material should be able to withstand the thermal requirements of the depositing materials. For example, one could grow a layer of cadmium sulfide on a zinc selenide substrate easier than growing zinc selenide on cadmium sulfide because the cadmium sulfide is unstable at the higher growth temperature of zinc selenide.

BRIEF DESCRIPTION OF DRAWINGS

The processes used for producing the composition or the layer on the substrate are logical ones and hence the illustrative drawings best depict these processes when in logic form. Accordingly.

EXEMPLARY EMBODIMENTS

THE PROCESS FOR THE COMPOSITION

Figure 1:
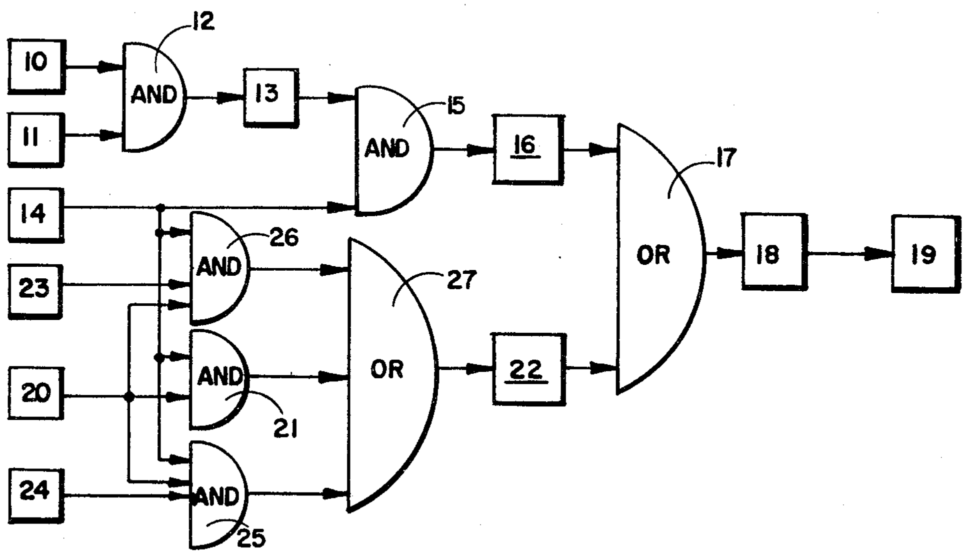
FIG. 1 is a logic diagram of one process of producing the inventive composition showing the relationships of the steps thereof.

FIG. 1 relates to a process for the production of a composition of the JQ compound formulation, where J is at least one element selected from the group consisting essentially of cadmium, zinc mercury and lead, and where Q is at least one element selected from the group consisting essentially of sulfur, tellurium, selenium and oxygen, which includes the steps of injecting at least one hydride having an element selected from group VI*a* into a reactor, and at least one alkyl compound having an element selected from group II*b* into the reactor thereby mixing the alkyl and hydride and forming a reaction product of the hydride and alkyl compounds, and heating the reaction product so as to form the JQ compound which serves as a composition for use in connection with providing a layer of the JQ compound on a substrate crystal.

The process is executed by providing a first component of a hydride containing hydrogen as at 10 and a second component of a hydride having an element of group VI*a* as at 11 for combining as depicted at logic AND gate 12 with the hydrogen in a reactor to form the requisite hydride as at 13. An alkyl compound having an element therein of the group II*b* elements is provided as at 14 for combining with the hydride as shown by logic AND gate 15, to mix in the reactor as at 16 and thereby form a reaction product of the hydride and the alkyl compound therein.

In the alternative, a hydride having an element of the group VI*a* elements is provided as at 20 for combination with the alkyl compound as at 14 as shown by the logic AND gate 21, both the alkyl compound and the hydride being injected into the reactor as at 22, the logic OR gate 27 showing the passing the hydride and alkyl compound which mix in the reactor to form the reaction product of the hydride and the alkyl compound.

An alternative approach of producing the reaction product in the reactor and resulting in a doped composition may be obtained by either of two approaches.

One approach is to provide alkyl doping of the composition. Hence an alkyl-type doping material as at 23 is combined with the alkyl compound as depicted by AND gate 26 for passing into the reactor to combine with the hydride thereby providing the reaction product with alkyl doping in the reactor as at 22.

Another approach is to provide hydride doping of the composition. Hence a hydride-type of doping material as at 24 is combined with the hydride as at 20 as depicted by AND logic gate 25 for passing into the reactor to combine with the alkyl compound thereby providing the reaction product with hydride doping in the reactor as at 22.

The hydride and alkyl doping materials are stated hereinbelow.

Either the reaction product as at 16 or the doped or undoped reaction product as at 22 are used, as exemplified by the alternative process step depicted by the logic OR gate 17 for further processing by heating said reaction product to a suitable temperature in the reactor as at 18 for forming the JQ compound composition in said reactor.

By-products, resulting from the heating and the forming of the JQ compound composition, are disposed of or drawn away from the reactor as at 19 by suitable disposal means, thereby leaving only the desired composition of the JQ compound in solidified or plastic form in the reactor for further use as a layer material for deposition on a substrate crystal. These by-products may be disposed of concurrently with and/or subsequent to the step of heating the reaction product.

Figure 2:
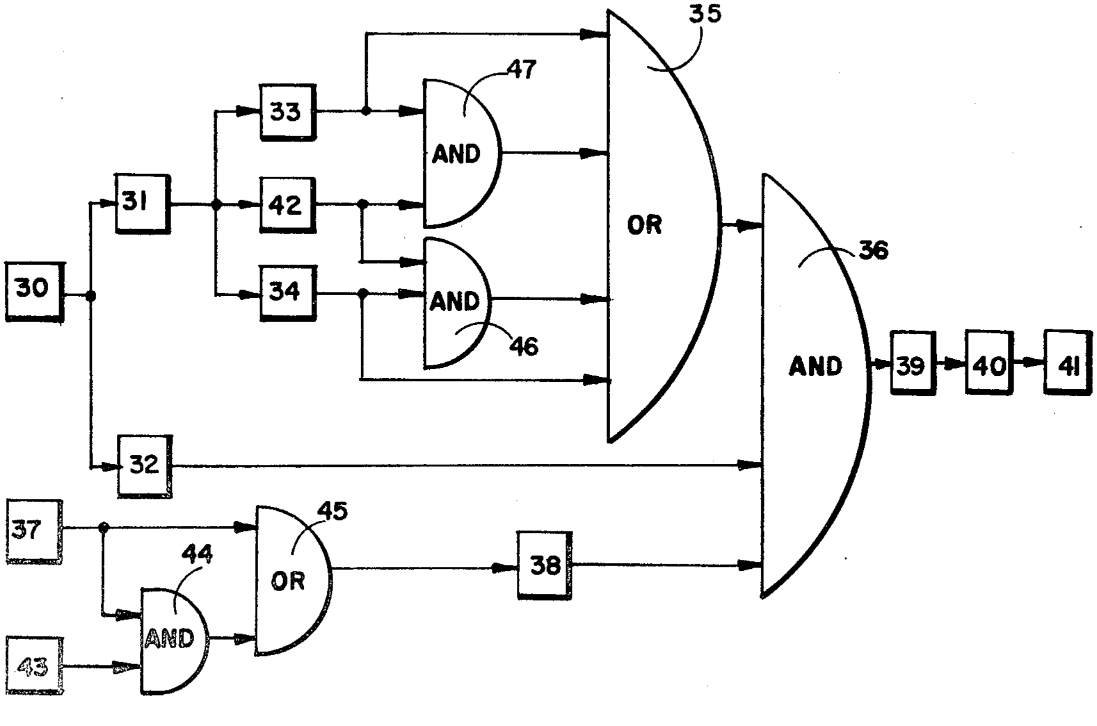
FIG. 2 is a logic diagram of an alternate approach towards producing the same composition as resulting from execution of steps in FIG. 1.

FIG. 2 relates to a process which may be used as an alternate to the process that is described in connection with FIG. 1, above.

Starting with an inert carrier gas, such as helium in gas source as at 30, the carrier gas is purified and passed on through flow rate control means 31 to either bubble through or pass the carrier gas over an alkyl compound in liquid or fluid form, the alkyl compound having an element therein selected from the Group II*b* as at 33, or the carrier gas is passed over an alkyl compound that may be in solid or plastic form wherein the alkyl compound has an element therein selected from the group II*b*, as at 34. Either the alkyl compound as at 33 or at 34 is used as exemplified by the logic OR gate 35 in furtherence of this process.

An alternate approach is to combine the alkyl compound as at 33 or 34 with a doping material as at 42. The dopant material could be of the liquid alkyl-type derivatives containing aluminum, gallium or indium. The alkyl compound and dopant would be combined as stated by AND gate 47 or by AND gate 46, these combinations made available at OR gate 35 for combining the output of gate 35 with filtered carrier gas at 32 into the input of AND gate 36. Hence the carrier gas may be flowed directly into the reactor prior to the step of injecting either the alkyl compound or hydride, or both therein.

At least one hydride having an element therein of group VI*a* as at 37 is purified and passed as shown by OR gate 45 and through flow rate control device 38. Also the purified inert carrier gas is passed on directly into the reactor joining with the hydride and with the carrier gas containing the alkyl compound as exemplified by the logic AND gate 36. Hence, the alkyl compound containing carrier gas, the hydride and the carrier gas directly are all injected as shown by AND gate 36 into the reactor as at 39, mixing therein to form a reaction product of the hydride and alkyl compound.

Alternately the hydride as at 37 may be combined with hydride-type doping material as at 43, when alkyl-type doping material is not used, as shown by AND gate 44, to be passed on through flow control device 38 and depicted by the OR logic gate 45, and then through logic AND gate 36 into the reactor as at 39. Typical hydride doping materials would consist of acceptor-type impurities such as phosphorus, antimony or arsenic.

The reaction product is then heated in the reactor as at 40 to form a composition of the JQ formulation, above stated. Also formed are reaction by-products. These by-products and the carrier gas used in the reaction and no longer needed, are disposed of as at 41.

The inert carrier gas may be flowed through or over the alkyl compound into the reactor either after to injecting of the hydride into the reactor or concurrently therewith. The inert carrier gas may be flowed directly into the reactor either prior to injecting of the hydride therein or concurrently therewith. In any event, injection of carrier gas, hydride, and carrier gas combined with alkyl components may occur prior to or simultaneously with the heating of the resultant mixture in the reactor. The by-products and the carrier gas used in connection with the reaction resulting from the step of heating may be disposed concurrently with and/or subsequently to the step of heating.

It is noted that where either the alkyl or hydride types of doping materials are used the reaction products will include the dopant.

The hydride containing group VI*a* elements is preferably used in excess over the stoichiometric amount required to react with the alkyl compound.

THE METHOD FOR MAKING THE COMPOSITE

Figure 3:
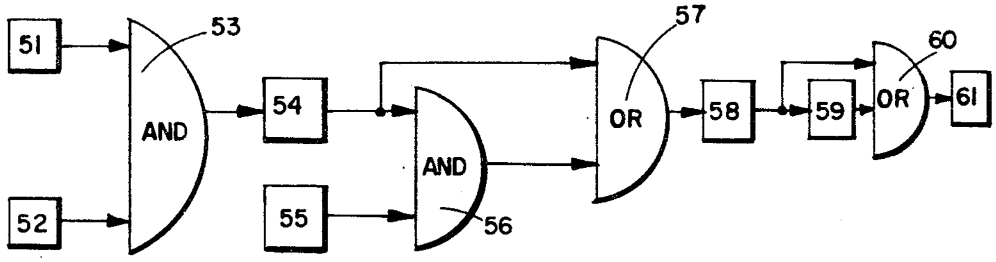
FIG. 3 is a logic diagram of a method for producing the inventive composite in the form of a doped or undoped layer on certain preselected substrate crystals, or for utilizing the same method to produce a structure having a plurality of layers.

FIG. 3 shows the logical steps of the method for making a composite which is comprised in combination of a substrate crystal and layer of the JQ composition on the substrate crystal, as hereinabove described.

The substrate crystal used has generally a hexagonal, cubic, orthorhombic or rhombohedral monocrystalline structure.

A typical substrate crystal such as beryllium oxide will have a hexagonal structure, such as aluminum oxide will have a rhombohedral structure, such as spinel will have a cubic structure, and such as chrysoberyl will have an orthorhombic structure.

The layer is formed or otherwise deposited on a surface or a portion of a surface of the substrate crystal. This layer may have a monocrystalline structure. The layer may optionally have a dopant material such as used in semiconductive devices, and produced from the hydride or alkyl types described above in connection with the method for making the composition.

The method is executed by positioning the substrate crystal in a reactor preferably on a rotatable supporting member within the reactor and preheating the substrate inside the reactor after positioning same therein and prior to deposition of the layer thereon.

At least one hydride under pressure, having an element which is selected from group VIa is injected into the reactor as at 52, then or simultaneously therewith at least one alkyl compound under pressure, having an element which is selected from group II*b* is injected into the reactor as at 51, to combine with the alkyl compound as denoted by logic AND gate 53. The alkyl compound and hydride are mixed in the reactor to form a reaction product of the alkyl compound and the hydride as at 54.

A dopant such as used in semiconductive devices to change the conductivity of the layer may be optionally introduced in the reactor as at 55 in substantially the same manner as alkyl or hydride dopants described in connection with the process for making the composition, supra, were introduced and combined with either the hydride or the alkyl compound in the reactor, so as to provide a substantially homogenous material consisting of the reaction product either with or without the dopant in the reactor as at 58. If no dopant is used the mixing of the alkyl compound and hydride will occur in the reactor as at 54, and the reaction product will be made ready for the heating step which follows OR logic gate 57 and shown as the heating step at 58. However, when either of the alkyl or hydride dopants are used, the particular dopant is introduced into the reactor as at 55, and as depicted by AND logic gate 56, will mix with the reaction product of the hydride and alkyl compound as at 54 to provide the alternate approach of forming a doped layer, the combined output of AND gate 56 depicted by being passed through OR gate 57 for the step of heating.

Hence either a doped material or an undoped material is stipulated by logic OR gate 57 to provide the JQ compound with or without the dopant therein for layer formation on the substrate crystal which had been preheated and is awaiting the heating step for formation of the layer thereon in the reactor.

Therefore, as at 58, the reaction product with or without the dopant is heated in the reactor to produce the aforesaid JQ compound, with or without the dopant therein, as a layer on at least a portion of the substrate crystal.

During the process of formation of the layer, the substrate crystal may be optionally rotated as at 59 by its rotatable supporting member (not shown) while the layer is being deposited on the substrate during the step of heating of the reactor at predetermined temperatures.

The heating step will produce by-products such as gases and other waste material resulting form the reaction of the reaction products with the surface of the substrate crystal. These gases are expelled either constantly during the heating step whether or not the substrate is being rotated, as depicted by the OR gate 60, where in one instance it is shown that expulsion of the reaction by-products occurs at 61 while heating without rotating the substrate, and in the other instance where it is shown that the by-products as at 61 are expelled during or after rotation of the substrate crystal.

The advantage of rotating the substrate crystal during layer deposition thereon is the achievement of uniform layer thickness.

Figure 4:
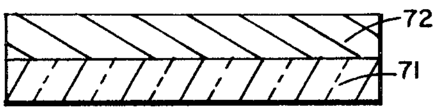
FIG. 4 is a single layer on the substrate crystal composite obtained by the inventive method.

It is noted that the product resulting from the method will be a composite as shown in FIG. 4 of a substrate crystal 71 of monocrystalline structure which is either of hexagonal, cubic, rhombohedral or orthorhombic structure, having a layer 72 thereon of the JQ compound formulation where J is at least one element selected from the group consisting essentially of cadmium, zinc and mercury and where Q is at least one element selected from the group consisting essentially of sulfur, tellurium, selenium, and/or oxygen. The layer may be of monocrystalline structure. The hexagonal substrate crystal may be beryllium oxide, the rhombohedral crystal may be aluminum oxide, the cubic crystal may be spinel or garnet and the orthorhombic crystal may be chrysoberyl. Dopants homogeneously distributed in the layer may be of the group containing aluminum, gallium or indium, or may be of the group containing phosphorous, antimony or arsenic.

Figure 5:
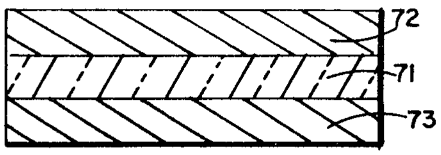
FIG. 5 is a composite obtained by the inventive method where a layer on each of two surfaces of the substrate crystal is produced.
Figure 7:
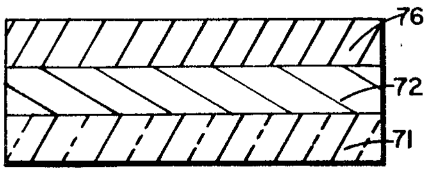
FIG. 7 is a composite of the inventive process showing multiple layers superimposed on each other.
Figure 6:
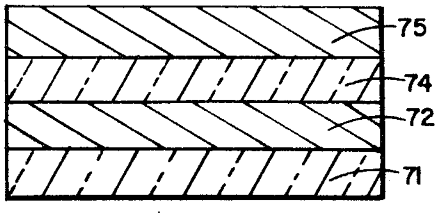
FIG. 6 is a composite obtained by the inventive material with layers interleaved between substrate crystals.

Repetition of the above method of doped or undoped layer deposition on the substrate crystal can result in a sandwich type of layers as shown in FIG. 5 with an insulating substrate 71 in between the layers 72 and 73, or the sandwich formation as in FIG. 6 with layer 72 on substrate 71, and another substrate 74 on top of the other major surface of layer 72, and another layer 75 on top of substrate 74. Another multiple layer structure as in FIG. 7 is possible by first depositing layer 72 on substrate 71 and then depositing another layer 76 aligned with specific portions of layer 72 for interconnection therewith. Interconnection of layers in FIGS. 5 or 6 may be done by external connections or by using apertures through predetermined locations of the substrates.

The following table represents crystallographic data for JQ compounds:

TABLE I

Exemplary JQ Compound Composition or Layer Material

| Crystallographic Structure | Compound Formulations |
|---|---|
| Wurtzite (hexagonal) | ZnO, ZnS, ZnSe*, ZnTe* CdS, CdSe, CdTe* |
| Zinc Blend (cubic) | ZnS, ZnSe, ZnTe, CdS*, CdSe, CdTe, HgS, HgSe, HgTe |
| NaCl (cubic) | Cd0 |
| Cinnabar (hexagonal) | HgO, HgS |
| Orthorhombic | HgO |

The crystallographic compounds denoted above by the asterisk (*) are less common than the other compounds above listed, but are nevertheless synthesizeable.

The following table gives crystallographic data for typical single-crystal insulators which are effective in controlling the crystallinity of the JQ compound grown upon them:

TABLE II

Exemplary Monocrystalline Substrate Crystals

| Crystallographic Structure | Compound Name |
|---|---|
| Rhombohedral | Aluminum oxide |
| Cubic | Spinel, Garnet |
| Hexagonal | Beryllium oxide |
| Orthorhombic | Chrysoberyl |

A typical substrate crystal of the cubic crystallographic structure of the spinel category is magnesium-aluminum-oxide or magnesium-chromium-oxide. A typical substrate crystal of the cubic crystallographic structure of the garnet category is gadolinium-gallium-garnet.

It is not necessary that the crystallography of the JQ compound and the single crystal insulator be the same, for the cubic modification of at least one of the JQ compounds, e.g. ZnSe, has been grown on substrates of rhombohedral, cubic, and hexagonal crystallography.

The following table is exemplary of layer and substrate crystal orientations possible:

TABLE III

Layer/Substrate Relationships

| Layer | Substrate |
|---|---|
| (111) selenides, sulfides, oxides and/or tellurides of zinc, cadmium, and/or mercury. | (0001) aluminum oxide<br>$(11\bar{2}3)$ aluminum oxide<br>$(11\bar{2}6)$ aluminum oxide<br>$(10\bar{1}4)$ aluminum oxide<br>$(0\bar{1}12)$ aluminum oxide<br>$(10\bar{1}1)$ beryllium oxide<br>(0001) beryllium oxide<br>(111) spinel<br>(211) garnet<br>$(10\bar{1}0)$ beryllium oxide |
| (100) selenides, sulfides and/or tellurides of zinc, cadmium, and/or mercury. | (100) spinel |

I claim:

1. A composite comprising in combination: a substrate crystal of monocrystalline structure, said substrate crystal being a substance selected from the group having hexagonal, cubic, rhombohedral and orthorhombic structures; and
   a layer on said substrate crystal of a JQ compound formulation, wherein J is at least one element selected from the group consisting of cadmium and zinc and wherein Q is at least one element selected from the group consisting of sulfur, tellurium, selenium, and oxygen.
2. The composite as stated in claim 1:
   said layer having a monocrystalline structure.
3. The composite as stated in claim 1:
   said hexagonal substrate crystal being beryllium oxide.
4. The composite as stated in claim 1:
   said rhombohedral substrate crystal being aluminum oxide.
5. The composite as stated in claim 1:
   said cubic substrate crystal being selected from the group consisting of the compounds of spinel and garnet.
6. The composite as stated in claim 1:
   said orthorhombic substrate crystal being chrysoberyl.
7. The composite as stated in claim 1, including:
   a dopant material distributed substantially homogeneously in said layer.
8. The composite as stated in claim 7, wherein:
   said dopant material consisting of an element selected from the group consisting of aluminum, gallium and indium.
9. The composite as stated in claim 7, wherein:
   said dopant material consisting of an element selected from the group consisting of phosphorus, antimony and arsenic.

10. A method for producing the composite as stated in claim 1, wherein said substrate crystal is positioned in a reactor, comprising the steps of:

a. heating said substrate crystal in the reactor after positioning same therein;
b. injecting into said reactor at least one hydride having an element selected from group VI*a*;
c. injecting into said reactor at least one alkyl compound having an element selected from group II*b* thereby mixing the alkyl compound and the hydride in the reactor and forming a reaction product of the hydride and the alkyl compound; and
d. heating said reaction product in said reactor so as to provide said JQ compound as said layer on at least a portion of said substrate crystal.

11. The method as set forth in claim 10, wherein:

the substrate crystal consists of a compound having a JQ formulation where J is at least one element from the group consisting of zinc and mercury and Q is at least one element selected from the group consisting of sulfur, tellurium, selenium and oxygen.

12. The method as set forth in claim 10, including the further step of:

e. rotating the substrate crystal concurrently with step (d) to provide substantial uniformity of thickness of said layer.

13. The method as set forth in claim 10, including the additional step of:

f. mixing a hydride-type doping material with said hydride concurrently with step (b) for providing said layer containing said doping material therein.

14. The method as set forth in claim 10, including the additional step of:

g. mixing an alkyl-type doping material with said alkyl compound concurrently with step (c) for providing said layer containing said doping material therein.

* * * * *